Nov. 18, 1924.

C. McDOWELL

GUM DENTIFRICE

Filed Jan. 15, 1923

1,516,398

Charles McDowell
INVENTOR

BY Victor J. Evans
ATTORNEY

WITNESSES

Patented Nov. 18, 1924.

1,516,398

UNITED STATES PATENT OFFICE.

CHARLES McDOWELL, OF RAPID CITY, SOUTH DAKOTA.

GUM DENTIFRICE.

Application filed January 15, 1923. Serial No. 612,707.

*To all whom it may concern:*

Be it known that I, CHARLES McDOWELL, a citizen of the United States, residing at Rapid City, in the county of Pennington and State of South Dakota, have invented new and useful Improvements in Gum Dentifrice, of which the following is a specification.

The present invention relates to a combined article constituting a confection and a dentifrice, and may be briefly described as being a receptacle composed of medicated chewing gum, and containing sodium perborate within said receptacle.

Figure 1:
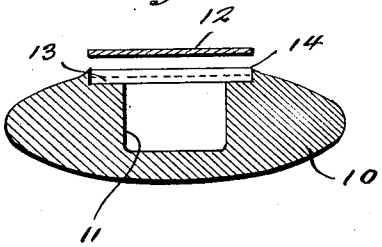
Figure 2:
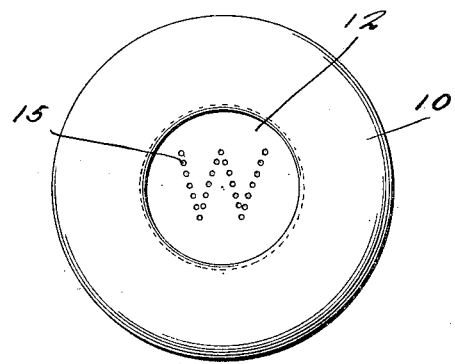
Figure 3:
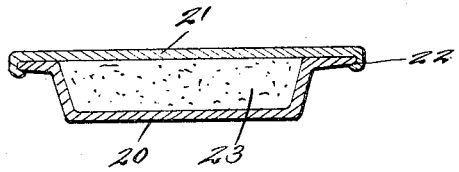

Fig. 1, is a sectional view of the partly completed article, Fig. 2 is a top plan view of the finished article. Fig 3 is a sectional view of a modified form of construction. It will be understood that the particular shapes illustrated are given for the purpose of illustration only, and various other shapes can be adopted, the invention relating rather to the composition than shape.

In accordance with the modifications shown in Figs. 1 and 2, a suitable sized piece of chewing gum material 10, containing dentifrice material incorporated therewith, such as 5 grains of precipitated chalk, and ½ grain of thymolized calcium phosphate, is made up into the form of a hollow piece or receptacle. This receptacle provides a cavity 11, into which subsequently 2½ grains of sodium perborate can be placed, after which the disk or cover 12, likewise made of chewing gum material, such as that above referred to, is pushed downwardly into the position indicated in dotted lines 13. It is then suitably sealed by crimping over the flanges 14. This does not have to fit tight, being merely pushed into place sufficiently to hold the same, and to prevent the powdered sodium perborate from falling out of the cavity 11.

Sodium perborate is a somewhat peculiar substance, in that it decomposes more rapidly when completely sealed up, than when access of air is allowed thereto. For this reason I provide a number of small perforations in the cover 12 as illustrated at 15. These perforations, are preferably small enough so that the powdered sodium perborate will not leak out or fall out and if desired may be arranged to form a design. In the drawing I have shown these perforations, first forming the letter W, but it is to be understood that any suitable design may be produced in this manner. The holes are preferably of the diameter of a pin. In the modification shown in Fig. 3 a bottom piece 20 is made into the form of a thin flattened receptacle, and a cover 21 is provided, either one of these parts being perforated. The two pieces can be pressed together or crimped together as at 22, after a suitable quantity of perborate 23 has been placed in to the cavity.

The entire article is preferably made of a size equal to an ordinary chew of gum. It is to be understood that while I have mentioned certain medicinal or dentifrice materials as being combined or incorporated with the chewing gum base, this is not intended to exclude the use of other medicinal or flavoring ingredients, and in fact it is preferable to add sugar and flavoring material to the chewing gum base. The article is used in the following manner: The article is placed in the mouth and is chewed in the same manner as a piece of chewing gum, whereupon the first bite breaks the cover and liberates the sodium perborate, in contact with the teeth of the user. The sodium perborate coming into contact with the saliva of the mouth forms hydrogen peroxide and borax. The hydrogen peroxid acts upon the slime and any other organic matter adhering to the teeth and destroys the same. The hydrogen peroxid forms a foamy fluid which can readily be forced back and forth between the teeth, dislodging any pus or fermented accumulations, and carrying the healing borate to all parts of the mouth. The borate also acts upon the tartar or inorganic matter accumulating upon the surface of the teeth, and dissolves any albumen materials which may be adhering to the teeth.

Sodium perborate has been found to be excellent for the treatment of "trench" mouth. The perborate and the thymolized calcium phosphate act to prevent Riggs' disease, or to entirely harden and heal up the gums in incipient cases of Riggs' disease. They both, and also the precipitated chalk, form antacid materials, the borate and thymol also being astringents and accordingly good for the treatment of tender teeth or sensitive dentine. The first mouthful or so of the fluid can be spit out, if desired, after slushing the teeth well, but if swallowed in small quantities it is not injurious. One of these wafers chewed each day will prevent accumulation of tartar on the teeth and will dissolve tartar or calculi if present. It keeps the mouth in a healthy condition and is especially beneficial as a dentrifice. It is to be understood that after the foaming has subsided, the gum can be chewed in the ordinary manner, the precipitated chalk and calcium phosphate, both serving as mild abradants for cleaning the teeth.

I claim:

1. An article of manufacture comprising a perforated receptacle composed of chewing gum material and containing in the cavity therein, an alkali metal perborate.

2. An article of manufacture comprising a chewing gum base, having incorporated therewith, mild abradant materials including precipitated chalk and thymolized calcium phosphate, such composition being formed into the shape of a perforated receptacle, and containing within the cavity thereof, an alkali metal perborate.

In testimony whereof I affix my signature.

CHARLES McDOWELL.